(12) United States Patent
Cheng et al.

(10) Patent No.: US 9,929,591 B2
(45) Date of Patent: Mar. 27, 2018

(54) SMART HOME POWER SYSTEM

(71) Applicants: Win Sheng Cheng, Cupertino, CA (US); Jeff Yeu-Farn Hsieh, Los Altos, CA (US); YiChien Hwang, Fremont, CA (US)

(72) Inventors: Win Sheng Cheng, Cupertino, CA (US); Jeff Yeu-Farn Hsieh, Los Altos, CA (US); YiChien Hwang, Fremont, CA (US)

(*) Notice: Subject to any disclaimer, the term of this patent is extended or adjusted under 35 U.S.C. 154(b) by 297 days.

(21) Appl. No.: 14/818,276

(22) Filed: Aug. 4, 2015

(65) Prior Publication Data

US 2016/0126783 A1    May 5, 2016

Related U.S. Application Data

(60) Provisional application No. 62/072,886, filed on Oct. 30, 2014.

(51) Int. Cl.
*H02J 9/06* (2006.01)
*H02J 3/14* (2006.01)
*H02J 13/00* (2006.01)

(52) U.S. Cl.
CPC .............. *H02J 9/062* (2013.01); *H02J 9/061* (2013.01); *H02J 3/14* (2013.01); *H02J 13/0079* (2013.01); *H02J 2003/146* (2013.01); *Y02B 70/3291* (2013.01); *Y02B 90/222* (2013.01); *Y04S 20/12* (2013.01); *Y04S 20/224* (2013.01); *Y04S 20/248* (2013.01)

(58) Field of Classification Search
CPC .. G05B 15/02; H02J 9/00; Y04S 20/12; Y04S 20/224; Y04S 20/248
See application file for complete search history.

(56) References Cited

U.S. PATENT DOCUMENTS

2008/0073117 A1* 3/2008 Misener ................. H02G 3/18
174/535
2014/0379160 A1* 12/2014 Fallon ..................... G06Q 50/06
700/297

* cited by examiner

*Primary Examiner* — Robert Deberadinis
(74) *Attorney, Agent, or Firm* — Skaar Ulbrich Macari, P.A.

(57) ABSTRACT

A smart power storage and distribution system for buildings includes an energy storage device included in an uninterruptible power system (UPS). A system controller controls charging of the energy storage system via one or both of conventional grid power and/or the alternative power. The system controller also operates a plurality of electrical switches to switch the building's power source between power from the utility grid and/or from the energy storage system. The controller also communicates with smart outlets within the building to selectively turn the power on/off to each smart outlet according to programmed logic or remote commands from a user. Various types of data can be monitored throughout the house/building and transmitted to the cloud. The source of electrical power to the building, or to charge the UPS, can be selectively switched to correspond to the most advantageous electrical grid monetary rates.

18 Claims, 2 Drawing Sheets

SMART HOME POWER SYSTEM

PRIORITY

This application claims the priority benefit of U.S. Provisional Application No. 62/072,886 filed on Oct. 30, 2014, which is hereby incorporated herein by reference in its entirety.

FIELD

The present invention relates generally to battery systems, and more particularly, to uninterruptible power supply (UPS) systems with power distribution control and monitoring for homes and buildings.

BACKGROUND

Homes and buildings are continually getting smarter in their connectivity and control, while persons increasingly desire to utilize environmentally friendly power sources such as solar to power these homes and buildings.

As shown in FIG. 1, conventional home or building power distribution systems 100 comprise electrical power supplied via a utility grid 101 to the home or building. The electrical power is fed through lines from the grid to an electricity meter 104 and then into the home or building via the home's or building's electric service panel 102. Then the power branches out throughout the home's or building's electrical wiring and terminates at a plurality of electrical outlets 103A, 103B, etc. Individual appliances located within the home or building need to be individually switched to control power usage by each such appliance.

The configuration of the conventional home or building power switching and distribution system is not easily adapted to alternative power sources and also is not easily integrated into a smart home/building control system. Therefore, there is a need to provide for an improved smart power system for homes and buildings.

SUMMARY

The present invention addresses the above-noted drawbacks of conventional home and building power storage and distribution systems by providing a smart energy storage and distribution system. A smart power storage and distribution system for buildings includes an energy storage device included in an uninterruptible power system (UPS). A system controller controls charging of the energy storage system via one or both of conventional grid power and/or the alternative power. The system controller also operates a plurality of electrical switches to switch the building's power source between power from the utility grid and/or from the energy storage system. The controller also communicates with smart outlets within the building to selectively turn the power on/off to each smart outlet according to programmed logic or remote commands from a user. Various types of data can be monitored throughout the house/building and transmitted to the cloud. The source of electrical power to the building, or to charge the UPS, can be selectively switched to correspond to the most advantageous electrical grid monetary rates.

The disclosure includes a smart energy storage and distribution system for homes and buildings, comprising an uninterruptible power supply electrically connected to an electrical utility grid and electrically connected to a building. The UPS includes an energy storage device and a charger coupled to the energy storage device. A first power distribution line switch is electrically disposed between the electrical utility grid and the UPS. A second power distribution line switch is electrically disposed between the UPS and the building. An outlet is disposed inside of the building and electrically connected to the power distribution line switch. A sub-controller is electrically disposed between the outlet and the power distribution line switch. A controller is coupled to the charger, the power distribution line switch, the outlet and the sub-controller. The controller includes non-transitory memory and a processor. Software code is stored in the memory and executable by the processor such that the controller selectively commands the sub-controller to couple and decouple electrical power to the outlet.

The disclosure further includes a method of providing and controlling electrical power for a building. A UPS is electrically connected between an electrical utility grid and the building. The UPS includes an energy storage device and a charger coupled to the energy storage device. A source of the electrical power for the building is switched from the electrical utility grid to the energy storage device. Electrical power to an outlet is selectively decoupled by a sub-controller that is in communication with a controller.

The disclosure further includes a method of providing and controlling electrical power for a building. A UPS is electrically connected between an electrical utility grid and the building. The UPS includes an energy storage device. Electrical power is supplied to the building from the energy storage device instead of the electrical power grid when monetary rates for the electrical power grid are at a peak value. The energy storage device is charged from the electrical power grid when monetary rates for the electrical power grid are at a minimum value.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
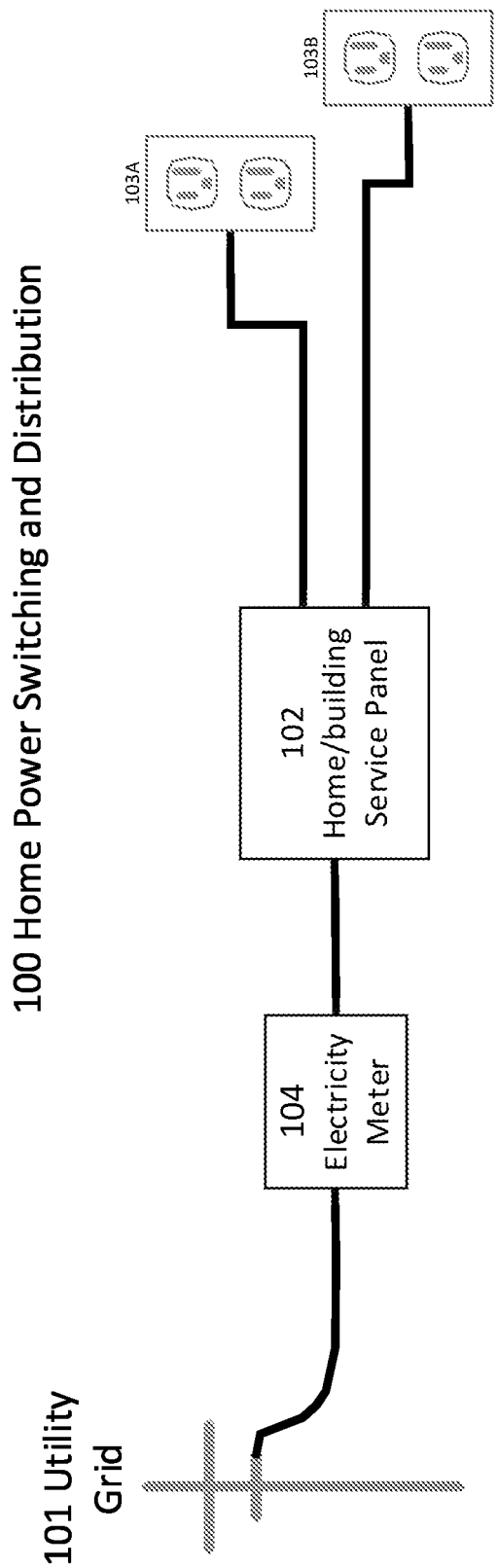
FIG. 1 is a diagram of a conventional home power switching and distribution system.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

The present smart power system 120 provides for an uninterruptible power supply (UPS) 130 plus power distribution control and monitoring for a house/building. The system includes intelligence to control individual power outlets (123) in homes and businesses.

Figure 2:
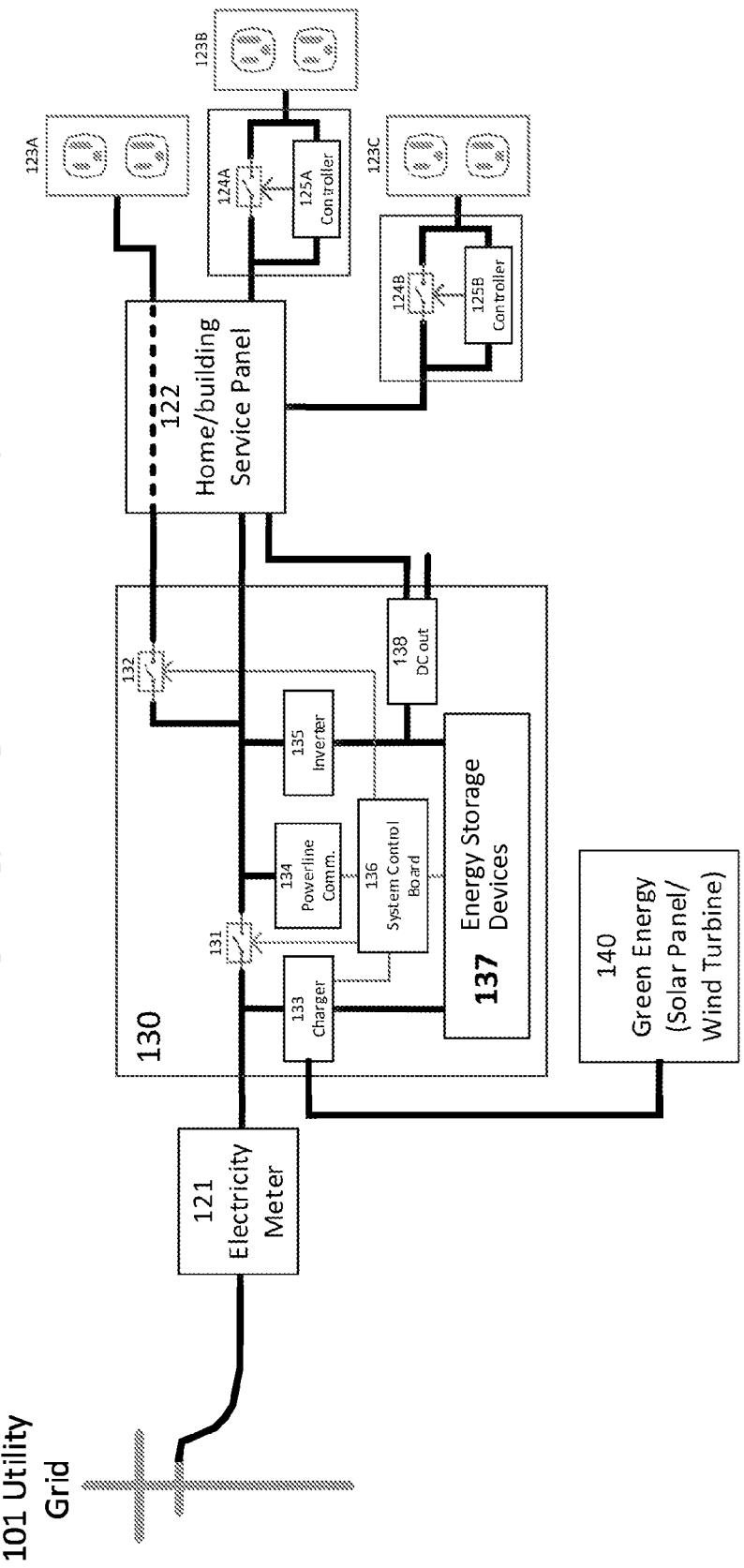
FIG. 2 is a diagram of a smart home/building energy storage and distribution system according to certain example embodiments.

Referring to FIG. 2, the smart home or building energy storage and energy distribution system 120 is shown according to one example embodiment. The house/building is connected to the conventional utility power grid 101 via an electricity meter 121.

The UPS 130 is connected between electric company's power grid 101 and building's Service Panel 122 as discussed above and shown in FIG. 2. In particular, the UPS 130 can be electrically disposed between the electricity meter 121 and the electric service panel 122 of the home/business.

The UPS 130 preferably has enough capacity to sustain the building/house with emergency energy for a predefined duration of power outage. The UPS 130 is modular and scalable such that the energy capacity of the UPS can be scaled to meet different voltage and backup run time requirements without having to redesign the entire system.

If an alternative power system 140, such as solar, wind energy or other "green" energy supply, is provided, the UPS 130 is again electrically disposed between the alternative energy supply 140 and the Service Panel 122. Thus, the alternative power system 140 can be considered part of the building's power grid.

The alternative energy supply can include solar panels, wind turbines, geothermal, hydroelectric, fossil fuel driven generators, or other energy generation systems, including any combination of one or more of these alternative systems. A separate meter can be optionally disposed between the alternative energy source 140 and the UPS 130 to measure the amount of energy received from the alternative energy source 140.

The UPS 130 acts a buffer between the alternative power system 140 and the electrical lines within the house or building. Thus, the house/building can be supplied with reliable power no matter the conditions of the utility grid 101 or the alternative energy source 140. For example, the grid 101 can fail periodically for periods of time and the alternative energy supply 140 can be unavailable (e.g., solar power/wind energy are weather dependent), but the home/building will still be able to receive power for a period of time.

The house/building system includes a charger 133 connected to the incoming grid power line and to one or more energy storage devices 137 such as battery packs/modules, super-capacitors, etc. The charger 133 can be controlled to charge the energy storage devices 137 by either one of, or both of, the grid power 101 and/or the alternative power 140.

A system control board 136 is coupled to the energy storage device 137, the charger 133, a power line communications device 134 and a plurality of power distribution line switches 131 and 132. The control board 136 includes a processor and memory for receiving software code to be executed by the processor that controls operation of the switches and other functions of the system. The switches 131 and 132 are controllably opened and closed to switch the power supplied to the house/building between the utility grid 101, alternative energy source 140, the energy storage device 137, or a combination of these sources.

The system controller 136 also includes software code to controllably couple the alternative energy source 140 to the electricity meter for outbound contribution to the grid 101. This can be either through the same grid meter 121 or via a dedicated outbound meter (not shown) connected to the grid 101.

The energy storage devices 137 can be connected to an inverter 135 to provide standard AC house current. A DC current output 138 can also be provided for devices that have such requirements. Such devices may be directly connected to the UPS 130 or connected to DC compatible outlets within the home/building.

Distribution within the house/building via the electrical lines can be run though a standard home/building service panel 122, which is connected to a plurality of individual outlets 123A, 123B, 123C, etc. Individual outlets can be of type AC or DC, or both, depending on the connection in the service panel and the outlet design. Switch 132 is disposed upstream of the panel 122 so that master power to the panel 122 can be turned on/off if desired.

Some or all of the individual outlets 123A, 123B, 123C, etc. throughout the house/building can be coupled to a respective sub-controller 125A, 125B, etc. and electric switch 124A, 124B, etc. These sub-controllers and switches allow the master system control 136 to execute software code to controllably turn power on and off to individual outlets according to any command or software logic programmed into the controller 136.

The controller 136 can be connected to a control interface such as a graphical user interface (not shown), typically disposed on a wall of the house in a place convenient for the user. In addition, the controller 136 can be remotely controlled via the internet from a computing device (e.g. smart phone, tablet or personal computer) that is also connected to the internet. A secure connection between the remote computing device and the controller 136 can be established using the internet or any suitable means.

The system controller 136 can signal individual compatible power sockets (having sub-controllers as discussed above) to change operating modes: Normal operation mode—no energy rationing measures applied; Low power operation mode—power socket communicates to device via power line or cabling to notify device of a power outage. Device may choose to go into low power mode or to shutdown. If chosen to shutdown, device will be given ample time to turn itself off; and Shut-off mode—power to socket is immediately turned off. This is primarily targeted towards non-essential and high energy consuming appliances such as electric ranges, ovens, microwaves, dryers, etc.

The UPS 130 is configured to provide surge protection against inbound power surges.

The system controller 136 can be programmed to communicate with individual power socket sub-controllers via wireless intranet such as ZigBee, Wi-Fi, power-line modem 134, Bluetooth, or other wireless communication means.

The system controller 136, charger 133, communications means 134, inverter 135 and energy storage device 137 can be integrated into a single UPS unit 130, or each component can be physically separate.

The system controller 136 communicates with the internet gateway via network cables or wireless intranet. Network connectivity allows information from individual power outlets 123A, 123B, 123C, etc. to be transmitted to a cloud server and accessed by users anywhere on the Internet to monitor a home's or building's energy usage.

Network connectivity also allows command or control signals to be sent by a user to individual power outlets 123A, 123B, 123C, etc., to control its operation. Thus, an appliance or device connected to a given outlet can be shut off, or the device can be notified to go into standby or low power mode. Examples include: turning off an electric range from a remote location; instructing a home computer to shutdown; and turning on/off living room lights remotely.

The controller 136 performs optimal battery management (e.g. not overcharging or going below a minimum charge setting, and avoiding overheating) to safeguard the lifespan of its batteries and to prevent the batteries from operating in an unsafe state.

The system 120 can also be operably coupled to motion sensors to identify movements and turn on power to sections in the house where motion exists, and to turn off power to sections where motion has not been sensed for a set amount of time.

Through its DC output 138, the UPS can also be used to charge batteries such as car batteries or power tool batteries. Thus, the UPS can be the one single point of energy storage and charging for all household/building energy needs.

Surplus energy generated by the alternative energy source 140 can be transmitted back to the grid for a credit by the grid utility company, if so permitted.

The system controller 136 can be programmed with a utility grid rate table such that the UPS 130 can be used to reduce peak energy usage. The UPS does so by monitoring home/building power usage and selectively switching to stored energy when electricity demand goes up above a prescribed monetary rate. The UPS 130 can also minimize electrical costs by intelligently charging itself during off-peak hours where the energy cost is at its lowest.

The present system in certain embodiments can conserve energy and save money on energy bills by balancing energy source usage decisions based on grid utility rate (e.g. off-peak versus peak time rates).

The present system in certain embodiments can provide ubiquitous power surge protection at a single point of connection. All home appliances will be protected.

Self-generated energy will be stored in the UPS power banks and the excess can be sold back to the power company. This gives the end customer a second reference point for how much energy is used and generated. Also, the user can reconcile their energy information against that reported by the power company.

The present system in certain embodiments can provide protection against power outages. Keep emergency lighting, garage door opener or electronic accessories available during power outage.

Individual power sockets in the house/building can be monitored and controlled. Their operations can be programmed and controlled by the controller 136, rather than by the outlets and appliances themselves. Thus, any conventional appliance can be operated as a "smart" appliance.

Sockets can be labeled and identified so that a meaningful summary of energy usage report can be generated automatically and accessed by users remotely.

The present system in certain embodiments can provide various types of monitored information to the user, including: total energy usage; peak energy usage; energy usage of individual outlets; energy leaks; external energy fluctuation; reconciliation with energy company records; and time mapping of energy usage.

Individual outlets or sockets can be automatically shut-off during pre-set times and off-hours to conserve energy at night and while away from the house/building.

In certain aspects of the invention, a system for providing uninterrupted power to a building (such as residential homes and businesses) is provided.

The battery power system 137 can comprise a plurality of battery modules connected to each other in parallel or in series based on the voltage and energy capacity needs of the building's or house's power grid requirements.

The controller 136 can include software code that permits any one or more of the following: controlling associated intelligent power sockets to change their operating modes based on decisions made from current energy status, including the event of power outage or restoration, utility power rates, energy usage of the building, and battery capacity; monitoring energy usage of the building; monitoring battery capacity and health; and protecting the battery from over charging, under voltage, thermal runaway.

A data communication device can be coupled to the system to enable the intelligent computational unit (system controller 136) to communicate with the intelligent power outlets or sockets (those connected to sub-controllers and switches such as 123B and 123C in FIG. 2) either wirelessly or through power line as well as to communicate to a router to access the internet.

The UPS 130 of the present system can be electrically coupled between the utility power grid and the building's internal power grid.

The UPS apparatus can be charged by the utility power grid or by an alternative power source in the building's internal power grid such as solar panel.

The system control unit 136 can include code or logic to signal individual compatible power sockets to change operating modes, including: normal operation mode—no energy rationing measures applied; low power operation mode—power outlet communicates to electrical device via power line or cabling to notify device of a power outage. Device may choose to go into low power mode or to shutdown. If chosen to shutdown, device will be given ample time to turn itself off; and shut-off mode—power to socket is immediately turned off. The shut-off mode is particularly useful for non-essential and high energy consuming appliances such as electric ranges, ovens, microwaves, dryers, etc.

Information collected by the system controller 136 can be stored in memory and/or transmitted to the internet cloud for ease of access by users and also for data analysis.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A smart energy storage and distribution system for homes and buildings, comprising:

an uninterruptible power supply (UPS) electrically connected to an electrical utility grid and electrically connected to a building, the UPS including an energy storage device and a charger coupled to the energy storage device;

a first power distribution line switch electrically disposed between the electrical utility grid and the UPS;

a second power distribution line switch electrically disposed between the UPS and the building;

an outlet disposed inside of the building and electrically connected to the power distribution line switch;

a sub-controller electrically disposed between the outlet and the power distribution line switch;

a controller coupled to the charger, the power distribution line switch, the outlet and the sub-controller, the controller including non-transitory memory and a processor, wherein software code is stored in the memory and executable by the processor such that the controller selectively commands the sub-controller to couple and decouple electrical power to the outlet.

2. The system of claim 1, further comprising an electrical power usage meter electrically disposed between the electrical utility grid and the UPS.

3. The system of claim 1, further comprising a building electrical service panel electrically disposed between the UPS and the building.

4. The system of claim 1, further comprising an alternative energy supply electrically connected to the UPS.

5. The system of claim 1, further comprising a communication means coupled to the controller for providing communication with a cloud server over the Internet.

6. The system of claim 1, wherein the controller further includes software code such that the controller de-couples the UPS from the electrical power grid by opening the first power distribution line switch, thereby supplying electrical power to the building from the energy storage device instead of the electrical power grid.

7. The system of claim 6, wherein the controller supplies electrical power to the building from the energy storage device instead of the electrical power grid when monetary rates for the electrical power grid are at a peak value.

8. The system of claim 1, wherein the controller further includes software code such that the controller commands the charger to charge the energy storage device when monetary rates for the electrical power grid are at a minimum value.

9. The system of claim 1, wherein the energy storage device comprises one or more batteries.

10. The system of claim 1, wherein the UPS includes a direct current (DC) output to the building.

11. The system of claim 1, wherein the UPS includes surge protector circuitry.

12. The system of claim 1, further including a motion sensor disposed inside of the building, wherein the controller is coupled to the motion sensor, and wherein the controller further includes software code such that the controller commands the sub-controller to decouple electrical power to the outlet when motion has not been sensed in a portion of the building where the motion sensor is located for a set period of time.

13. The system of claim 1, further including a motion sensor disposed inside of the building, wherein the controller is coupled to the motion sensor, and wherein the controller further includes software code such that the controller commands the sub-controller to couple electrical power to the outlet when motion is sensed in a portion of the building where the motion sensor is located.

14. A method of providing and controlling electrical power for a building, the method comprising:

electrically connecting a UPS between an electrical utility grid and the building, the UPS including an energy storage device and a charger coupled to the energy storage device;

switching a source of the electrical power for the building from the electrical utility grid to the energy storage device; and decoupling electrical power to an outlet by a sub-controller that is in communication with a controller.

15. The method of claim 14, further comprising:

coupling an alternative energy supply electrically to the UPS; and charging the energy storage device with the alternative energy supply.

16. The method of claim 15, further comprising switching the source of the electrical power for the building from the electrical utility grid to the alternative energy supply.

17. The method of claim 14, wherein the step of decoupling electrical power to the outlet by the sub-controller is performed in response to a control command received via the Internet.

18. The method of claim 14, further comprising monitoring an energy usage parameter of the building and uploading the energy usage parameter to a cloud server via the Internet.

* * * * *